United States Patent [19]

Izutani et al.

[11] Patent Number: 4,844,793

[45] Date of Patent: Jul. 4, 1989

[54] FUEL HEATING TYPE FUEL FILTER DEVICE

[75] Inventors: Kouji Izutani, Nagoya; Isamu Shigeta, Toyoda, both of Japan

[73] Assignee: Nippondenso Co., Ltd., Kariya, Japan

[21] Appl. No.: 191,782

[22] Filed: May 4, 1988

Related U.S. Application Data

[63] Continuation of Ser. No. 17,673, Feb. 24, 1987, abandoned.

[30] Foreign Application Priority Data

Feb. 25, 1986 [JP] Japan .................................. 61-39430
Jan. 6, 1987 [JP] Japan ...................................... 62-168

[51] Int. Cl.⁴ ........................ B01D 17/12; B01D 35/18
[52] U.S. Cl. ..................................... 210/97; 123/549; 123/557; 210/149; 210/175; 210/184
[58] Field of Search ................. 210/104, 134, 97, 103, 210/149, 175, 184–186, 416.4; 219/501, 202, 205, 206, 332, 333; 123/549, 557

[56] References Cited

U.S. PATENT DOCUMENTS

| | | | |
|---|---|---|---|
| 4,321,136 | 3/1982 | Matsui | 210/186 |
| 4,387,691 | 6/1983 | Marcoux et al. | 210/186 |
| 4,404,949 | 9/1983 | Bell | 210/184 |
| 4,437,986 | 3/1984 | Hutchins et al. | 210/184 |
| 4,515,690 | 5/1985 | Yasuhara | 210/416.4 |
| 4,539,108 | 9/1985 | Izutani et al. | 210/186 |
| 4,646,703 | 3/1987 | Bradford et al. | 210/184 |

FOREIGN PATENT DOCUMENTS 2140319  3/1986  United Kingdom.

Primary Examiner—Frank Spear
Assistant Examiner—Joseph Drodge
Attorney, Agent, or Firm—Cushman, Darby & Cushman

[57] ABSTRACT

A fuel heating type fuel filter device having a fuel filter assembly and a fuel heating device connected to the fuel filter assembly. A fuel filter element is housed in the fuel filter assembly. The fuel heating device includes a housing having a fuel passage which is connected to the fuel filter assembly. A heater is disposed in the fuel passage to heat the fuel and liquify a solidified wax component contained in the fuel. A wax sensor is provided in the housing to sense the amount of solidified wax contained in the fuel. A switch is housed in the housing and turned ON to supply an electric power to the heater when the amount of solidified wax is more than a predetermined value.

11 Claims, 8 Drawing Sheets

FUEL HEATING TYPE FUEL FILTER DEVICE

This is a continuation of Ser. No. 017,673 filed 2-24-87 now abandoned.

BACKGROUND OF THE INVENTION

1. Field of the Invention

The present invention relates to a fuel heating type fuel filter device which is suitable for use in vehicles equipped with diesel engines.

2. Description of the Related Art

The fuel used with a diesel engine, i.e., light oil, tends to solidify into a wax-like state when cooled below $-10°$ C., thus tending to cause a blockage in the fuel filter. This clogging obstructs the supply of fuel to the engine, and thus a smooth operation of the engine is not obtained. Accordingly, the fuel must be heated in low temperature conditions. U.S. Pat. No. 4,539,108 and U.K. Patent No. 2140319 disclose constructions in which a heater made of a material having a positive temperature coefficient of resistance is provided in a fuel passage of a fuel filter device, to heat the fuel and thus liquify the wax component in the fuel.

In the above conventional fuel filter device, however, a switch for supplying electric power to the heater is provided separately from the heater, and thus the structure of the device must be large in size.

SUMMARY OF THE INVENTION

Therefore, an object of the present invention is to provide a fuel filter device having a compact size.

According to the present invention, there is provided a fuel filter device having a fuel heating device connected to a fuel filter assembly, the fuel heating device comprising a housing, a heater, an electric source, an electric circuit, and a wax sensing means. The housing has a fuel passage formed therein through which fuel passes, and which communicates with a fuel supply passage in which a fuel filter element is provided. The heater is provided in the fuel passage to provide heat when an electric current is applied thereto from the electric source. The electric circuit connects the electric source and the heater through a switch housed in the housing. The wax sensing means is provided for sensing an amount of wax included in the fuel, and is housed in the housing and connected to the switch, to turn ON the switch when an amount of wax in the fuel is higher than a predetermined value.

BRIEF DESCRIPTION OF THE DRAWINGS

The present invention may be more fully understood from the description of preferred embodiments of the invention set forth below, together with the accompanying drawings, in which.

DESCRIPTION OF THE PREFERRED EMBODIMENTS

The present invention will be described below with reference to preferred embodiments.

Figure 1:
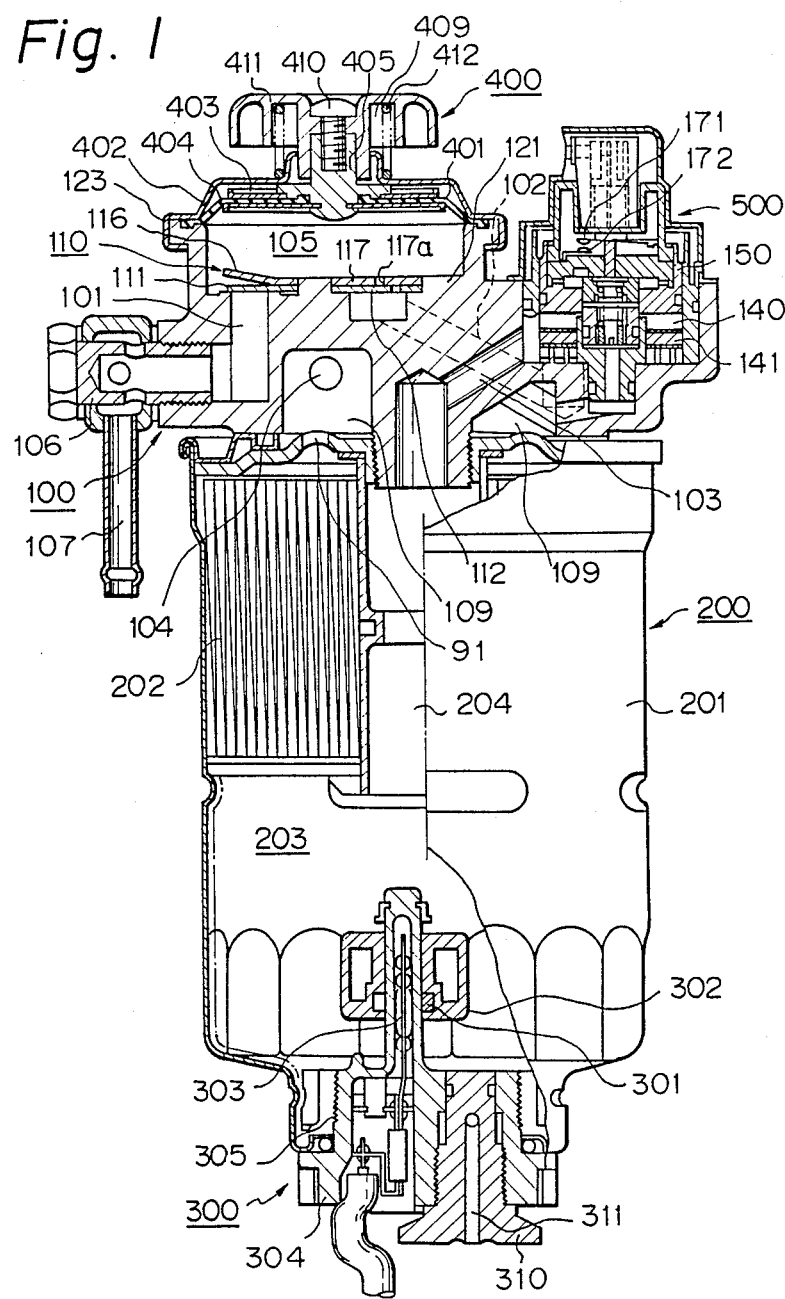
FIG. 1 is a partly sectioned front elevational view of a first embodiment of the present invention.

FIG. 1 shows a first embodiment of the present invention. In this drawing, the fuel filter device is composed of a metal upper body 100, a fuel filter assembly 200, a level switch 300, and a hand pump 400. The upper body 100 is provided with a fuel heating device 500. The main part of the fuel filter assembly 200 comprises a metal casing 201, an axial flow type filter element 202, and a space 203 acting as a water reservoir. A cylindrical member 204 is disposed at the axial portion of the metal casing 201, and a filter element 202 is fitted to the cylindrical member 204. Fuel flows through the upper body 100 and into the space 203 through the cylindrical member 204. The fuel is then made to flow through the filter element 202, and flows into the body 100 through an outlet mouth 91, and then flows out of the upper body 100 through an outlet port 104.

The upper body 100 is provided with an inlet port 101, an upstream fuel passage 102, a downstream fuel passage 103, and the outlet port 104. The top portion of the upper body 100 is defined as a diaphragm chamber 105 by a diaphragm 401 of the hand pump 400, and the bottom portion of the upper body 100 is formed as an outlet chamber 109 communicating with the outlet port 104. A projection 106 provided with a fuel inlet tube 107 is threadingly engaged with an inlet portion of the inlet port 101. Thus, fuel is pressurized by a fuel pump (not shown) and sent to the fuel filter device, and flows into the inlet port 101 through the fuel inlet tube 107 and the projection 106. The fuel exerts pressure on an input portion 111 of a valve assembly 110, causing the portion 111 to open and allow the fuel to flow into the diaphragm chamber 105. The fuel then exerts pressure on an output portion 112 of the valve assembly 110, causing the portion 112 to open and allow the fuel to flow into the upstream fuel passage 102. The fuel then flows through the fuel heating device 500 and into the downstream passage 103, and then flows out of the outlet port 104 after being filtered by the filter element 202.

Figure 2:
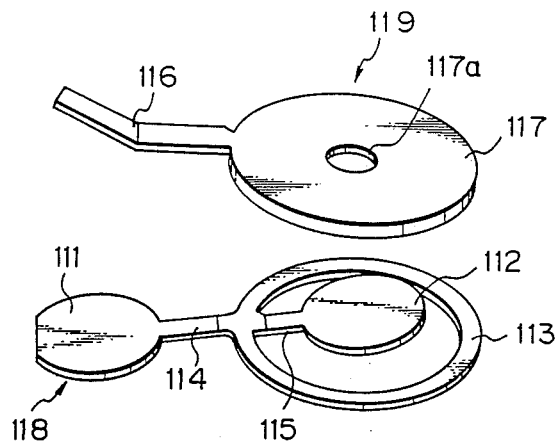
FIG. 2 is a perspective view of a valve assembly in a disassembled state.
Figure 3:
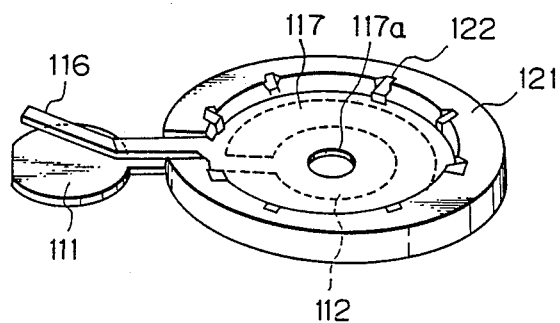
FIG. 3 is a perspective view of a valve assembly.

FIGS. 2 and 3 show a detailed construction of the valve assembly 110. The valve assembly 110 is composed of a valve member 118 and a support member 119. The valve member 118 is formed integrally by punching a sheet of spring steel, and has a disc-shaped entrance plate 111, a disk-shaped exit plate 112, and a ring portion 113. The entrance plate 111 and the ring portion 113 are connected by a flexible plate 114, and the exit plate 112 and the ring portion 113 are connected by another flexible plate 115. The support member 119 is integrally formed by punching a sheet of, for example, stainless steel, and has a stopper portion 116 facing the upper surface of the entrance plate 111, and a disc 117 engaging with the upper surfaces of the ring portion 113 and the exit plate 112. The center part of the disc 117 is provided with a hole 117a.

The valve member 118 and the support member 119 are assembled as shown in FIG. 3. Namely, the support member 119 is disposed on the valve member 118 in such a manner that the stopper portion 116 is placed above the entrance plate 111 and the disc 117 is placed on the exit plate 112. The assembly of the support member 119 and the valve member 118 is attached to the upper surface of the upper body 100 in such a manner that the entrance plate 111 closes the inlet port 101 and the exit plate 112 closes the upstream fuel passage 102 (see FIG. 1). Namely, the ring portion 113 and the disc 117 are fitted in an inlet portion 121 of the upstream fuel passage 102. The inner peripheral portion of the inlet portion 121 is plastically deformed at a plurality of portions therealong to form claws 122 by which the disc 117 and the ring portion 113 are fastened to the upper body 100. The entrance plate 111 is displaced upward by a fuel pressure in the inlet port 101 to open the port 101, whereby fuel is allowed to flow into the diaphragm chamber 105 through the inlet port 101. The amount of upward displacement of the input portion 111 is restricted by the stopper portion 116. On the other hand, the exit plate 112 is displaced downward by a fuel pressure in the diaphragm chamber 105, to open the upstream fuel passage 102 so that fuel in the diaphragm chamber 105 is allowed to flow into the fuel passage 102.

As shown in FIG. 1, the hand pump 400 is provided above the diaphragm chamber 105, which is closed to the atmosphere by the diaphragm 401 of the hand pump 400. The diaphragm 401 is made of a flexible material such as rubber, and the outer periphery of the diaphragm 401 is fixed to the upper end of a cylindrical wall 123 by a metal cover 402 fitted on the upper end of the cylindrical wall 123. The diaphragm 401 is sandwiched by metal plates 403 and 404, which are fixed to the diaphragm 401 by plastically deforming the tip portion of a metal fitting member 405 which extends through the diaphragm 401. The upper end of the fitting member 405 projects outside the metal cover 402, and is attached to a plastic bowl-shaped handle 411 by a small screw bolt 410. This handle 411 is bowl-shaped and covers the upper portion of the cover 402, and has recesses 409 formed in the bottom thereof to accommodate a coil spring 412 provided between the handle 411 and the cover 402. Therefore, when the handle 411 is pressed down by hand, the coil spring 412 is compressed so that the fitting member 405 is moved downward to deform the diaphragm 401 downward, and when the handle 411 is released, the coil spring 412 is expanded so that the fitting member 405 is moved upward to restore the diaphragm 401 to its original position. This up and down movement of the handle 411 causes a pressure change in the diaphragm chamber 105, and thus fuel can be supplied to the fuel filter assembly 200 through the valve assembly 110.

Figure 4:
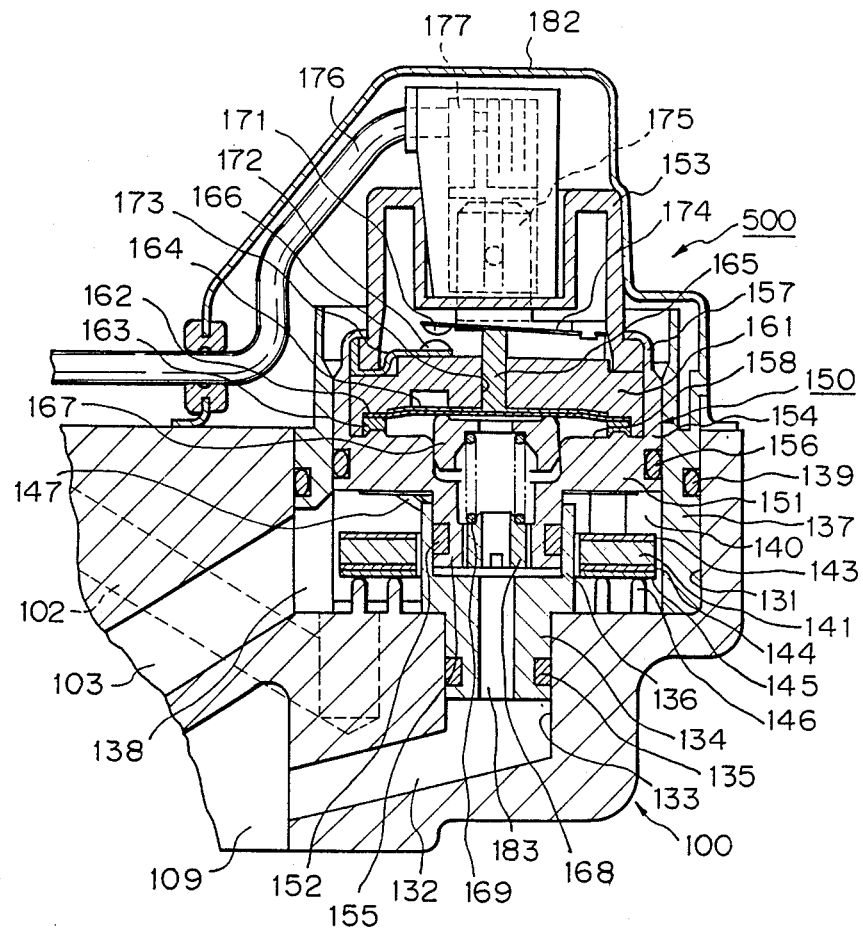
FIG. 4 is a sectional view of a fuel heating device of the first embodiment.

The upper body 100 has a fuel heating device 500 attached thereto. FIG. 4 shows the construction of the heating device 500 in detail. As shown in the figure, the upper body 100 is provided with a cylindrical bore 131 which communicates with the diaphragm chamber 105 through the upstream fuel passage 102, and communicates with the cylindrical member 204 (FIG. 1) of the fuel filter assembly 200 through the downstream fuel passage 103. A lower portion of the bore 131 of the upper body 100 is provided with a pressure passage 132 communicating with the outlet chamber 109. A tube member 134 made of a heat resistant and insulating material is fitted in a bore 133 connecting the pressure passage 132 and the bore 131. This tube member 134 projects into the bore 131, and an O-ring 135 for sealing is provided between the tube member 134 and the bore 133. A lower housing 151 of a pressure sensor 150 is fitted in a cylindrical portion 136 formed at the upper portion of the tube member 134, and an O-ring 152 is fitted in the outer surface of the lower housing 151. A cylindrical spacer 137 having an O-ring 139 on the outer surface thereof is inserted in the bore 131. The cylindrical spacer 137 is made of a heat resisting and insulating material, and has a port 138 communicating with the downstream fuel passage 103. Thus, an annular chamber 140 is defined by the upper body 100, the spacer 137, the lower housing 151, and the tube member 134. The upstream fuel passage 102 and the downstream fuel passage 103 communicate with the annular chamber 140, however, the pressure passage 132 does not communicate with the annular chamber 140 but communicates with the pressure sensor 150 through a pressure passage 183 formed in the axial portion of the tube member 134.

Figure 6:
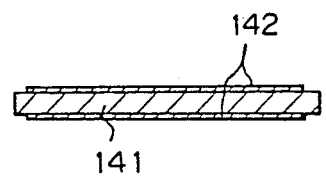
FIG. 6 is a sectional view of a heater element.
Figure 7:
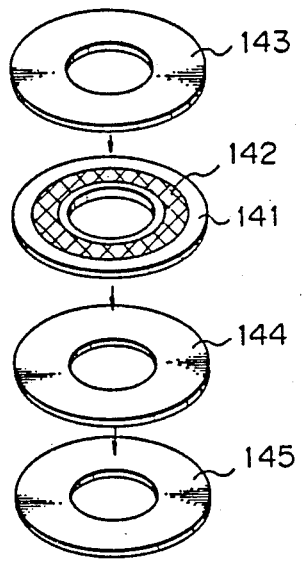
FIG. 7 is a perspective view of a heater in a disassembled state.

An annular ceramic heating element 141 is housed in the annular chamber 140. The heating element 141 is made of a positive temperature coefficient (PTC) material. As shown in FIG. 6, the upper and lower surfaces of the heating element 141 are coated with silver to a thickness of a few microns to several tens of microns to form electrodes 142. These electrodes 142 are covered with metal washers 143 and 144, respectively, which are made of copper having a good heat and electrical conductivity, and which have approximately the same shape as the heating element 141, as shown in FIG. 7. A second metal washer 145 is disposed under the lower surface of the lower washer 144. The bottom portion of the bore 131 is formed with an appropriate number of projections 146 having semi-spherical tip portions. The second metal washer 145 is placed on the projections 146, and the heating element 141 sandwiched by the metal washers 143 and 144 is placed on the second metal washer 145. A circular spring 147 is provided between the upper metal washer 143 and the lower housing 151 of the pressure sensor 150. The spring force of the spring 147 keeps the metal washers 143 and 144, the heating element 141, and the second metal washer 145 in contact with each other, and the second metal washer 145 in contact with the projections 146. The projections 146 provide an effective electrical contact between the second metal washer 145 and the upper body 100, and in addition, prevent the transmittance of heat from the heating element 141 to the upper body 100.

The housing of the pressure sensor 150 is composed of the lower housing 151 and an upper housing 153. The lower housing 151 has a large diameter portion 154 and a small diameter portion 155. The large diameter portion 154 is fitted in the spacer 137 with an O-ring 156 fitted between the large diameter portion 154 and the spacer 137. The small diameter portion 155 is fitted in the cylindrical portion 136 of the tube member 134 with an O-ring 152 fitted between the small diameter portion 155 and the cylindrical portion 136. The upper housing 153 is fitted in the upper end 157 of the large diameter portion 154 of the lower housing 151 to be fixed to the lower housing 151. An annular supporting surface 158 is formed between the large diameter portion 154 and the small diameter portion 155 of the lower housing 151, and disc member 161 is sandwiched between the supporting surface 158 and the lower end of the upper housing 153. A diaphragm 162 is disposed under the disc member 161, and the outer periphery of the diaphragm 162 is sandwiched between the disc member 161 and a ring member 163 placed on the supporting surface 158. The lower surface of the diaphragm 162 is subjected to a pressure from the outlet chamber 109 of the fuel filter assembly through the pressure passage 132 of the body 100 and the pressure passage 183 of the tube member 134. Namely, the diaphragm 162 acts as a pressure sensor. A dish-shaped metal plate 164 having a snapping action is fixed on the upper surface of the diaphragm 162, and a rod 165 is formed on the upper surface of the dish-shaped metal plate 164 and extends through a hole 166 formed in the disc member 161 and projects from the upper side of the disc member 161. A dish-shaped plastic plate 167 is provided under the diaphragm 162, and is urged upward by a spring 169 provided between an adjusting nut 168 threadingly fitted in the small diameter portion 155 of the lower housing 151 and the plastic plate 167, to come into contact with the diaphragm 162.

Figure 5:
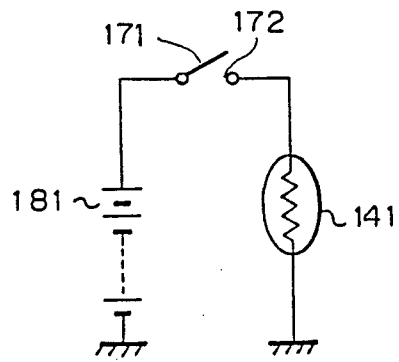
FIG. 5 is a diagram of an electric circuit of the fuel heating device shown in FIG. 4.

A movable contact 171 and a fixed contact 172 are provided in the housing. The size and material of the contacts 171 and 172 are such that these contacts can withstand a large electric current. The fixed contact 172 is formed on an end of a connecting metal plate 173 having an electric conductiveness and provided on the disc member 161; the other end of this connecting plate 173 being sandwiched between the lower end of the upper housing 153, the upper end 157 of the lower housing 151, and the disc member 161. The movable contact 171 is formed on an end of an electrically conductive connecting metal plate 174 which is fixed on an inner wall of an upper housing 153. A lower surface of the connecting metal plate 174 is in contact with the rod 165, and thus the contacts 171 and 172 are opened and closed by the up and down movement of the rod 165. Namely, when a negative pressure is not substantially placed on the lower surface of the diaphragm 162, the diaphragm 162 is positioned at an upper position by a force of the spring 169, so that the rod 165 is moved upward to push up the connecting metal plate 174 and open the contacts 171 and 172. Conversely, when a negative pressure is substantially placed on the lower surface of the diaphragm 162, the diaphragm 162 is pulled downward by this negative pressure to displace to a lower position, so that the rod 165 is moved downward to displace the connecting metal plate 174 downward and close the contacts 171 and 172. A terminal 175 connected to the connecting metal plate 174 is connected to a terminal 177 connected to a lead line 176, the lead line 176 being connected to a positive electrode of an electric source 181 (FIG. 5). Thus, the electric source 181, the contacts 171 and 172, and the heating element 141 are electrically connected as shown in FIG. 5, so that an electric power is supplied to the heating element 141 to provide heat, by closing the contacts 171 and 172.

A bowl-shaped cover 182 is fixed to the upper body 100 by small screw bolts (not shown) to cover the upper housing 153 and the terminals 175 and 177, and the lead lines 176 extend through the cover 182 and outside thereof, to be connected to the electric source 181. This cover 182 prevents dirt and water from entering the device. The operating pressure of the switch 150 is adjusted by rotating the nut 168 to change the force of the spring 169.

Referring to FIG. 1, the level switch device 300 has a lead switch 303 having a float 302 with a known magnet 301. A body 304 of the level switch device 300 is threadingly fitted in a nut portion 305 provided on a bottom wall of the casing 201 of the fuel filter assembly 200, and a plug 310 for draining water in the assembly 200 is attached to the body 304 of the level switch device 300. When the plug 310 is loosened or detached from the body 304, a transverse groove (not shown) formed in the body 304 communicates with an axial hole 311 so that the space 203 of the assembly 200 is open to the atmosphere.

The operation of the first embodiment constructed as described above is as follows.

Fuel supplied to the fuel filter device by a fuel pump (not shown) flows into the space 203 after passing through the heating device 500. While the fuel is held in the space 203, water contained in the fuel sinks downward in the space 203 due to the specific gravity difference between the fuel and the water, and the water is thus separated from the fuel. Then, after the water is removed, the fuel is filtered while passing through the filter element 202 in an axial direction, and is supplied to a fuel pump and then the engine through the outlet port 104 provided at the upper body 100.

When a level of the water in the space 203 reaches a certain height, the float 302 of the level switch device 300 moves up so that the magnet 301 turns ON the lead switch 303. Accordingly, a warning lamp or buzzer provided in an instrument panel of the vehicle warns the driver of this condition. Thus, when a certain amount of water is sensed in the space 203, the drain plug 310 is loosened by hand so that the space 203 is open to the outside of the fuel filter device. Then the handle 411 of the hand pump 400 is moved up and down repeatedly, to displace the diaphragm 404 reciprocally, so that a pressure change is generated in the diaphragm chamber 105. As a result, the exit plate 112 of the valve assembly 110 opens intermittently, so that water surface in the space 203 is subjected to repeated pressure, and thus the water is discharged from the fuel filter device through the axial hole 311 of the drain plug 300.

Note that, although the hand pump 400 is described as being used for draining water from the space 203, the hand pump 400 also may be used for supplying fuel into the filter assembly 200 when the filter assembly 200 is exchanged. In normal operation, the inside of the hand pump 400 acts as a part of the general fuel passage.

When the temperature of fuel is low, wax present in the fuel solidifies to cause clogging in the filter element 202. The greater the wax clogging of the filter element 202, the greater is the negative pressure downstream of the filter element 202. If the negative pressure becomes greater than a predetermined value, the pressure sensor 150 causes the contacts 171 and 172 to close, so that an electric current flows through the lead line 176, the terminals 177 and 175, the contacts 171 and 172, the connecting plate 173, the lower housing 154, the spring 147, the washer 143, the heating element 141, and the washers 144 and 145, in this order. Therefore, the heating element 141 is supplied with an electric current to provide heat. Fuel is heated by the heating element 141 while circulating around the annular chamber 140, so that wax component in the fuel and the wax clogging the filter element 202 are liquified. Thus the negative pressure downstream portion of the filter element 202 is reduced, and thus the contacts 171 and 172 of the pressure sensor 150 are opened to stop the supply of electric current to the heating element 141. As stated above, the pressure sensor 150 indirectly senses the amount of wax contained in the fuel, to close the contacts 171 and 172 and operate the heater 141 when the filter element 202 begins to be clogged, because the amount of wax solidified in the fuel becomes more than a predetermined value.

When the pressure sensor 150 is turned OFF, the temperature of the fuel is lowered so that the filter element 202 is again clogged, the above described heating process is then carried out again until the temperature of the fuel reaches a value at which the wax is liquified. Since such a heating process is carried out only when the filter is clogged and may have an adverse effect on the engine, the amount of electric power needed to operate the device is very small.

Although the heating element 141 is preferably in direct contact with the fuel, to obtain a high heating effectiveness, the effectiveness of the electrode 142 would be reduced by contact with the water when an electric current is applied thereto. Therefore, in this embodiment, the electrodes 142 are covered with the metal members 143 and 144 in a sandwich construction. Accordingly, the electrodes 142 are not exposed to contact with the water, so that the effectiveness of the electrodes 142 is maintained and thus a desired heating is obtained without fail.

Further, in this embodiment, the second washer 145 is provided under the washer 144. This stacked construction of these washers 144 and 145 gives the following effect. Preferably, the upper body 100 is formed from an aluminum material, for manufacturing ease, electrical conductivity, and reduced cost. On the other hand, the electrodes 142 are formed by spattering silver onto the heating element 141, and the washers 143 and 144 are preferably made from copper, which has a small electric potential difference from that of the silver, to prevent electrolytic corrosion. However, there is a large electric potential difference between the copper and the aluminum, so that electrolytic corrosion may occur if the washer 144 is in contact with the projections 146. Therefore, in this embodiment, the second washer 145 made of, for example, a stainless steel having an electric potential midway between that of the copper and that of the aluminum, is inserted between the washer 144 and the projections 146, so that electrolytic corrosion is prevented.

Still further, in this embodiment, the lower housing 154 of the pressure switch 150 is used as a positive electrode relative to the heating element 141, which is urged downward by the spring 147. This construction enables a connecting line between the positive electrode of the heating element 141 and the pressure sensor 150 to be omitted, simplifying the construction.

The pressure sensor 150 of the embodiment has a construction in which the contacts 171 and 172 are turned ON or OFF at short intervals by the dish-shaped metal plate 164 carrying out a snapping action, and the contacts 171 and 172 are made of a material and size such that a large electric current can flow through the contacts 171 and 172. Therefore, a relay for supplying electric power to the heating element 141, and thus electrical wiring between the relay and the pressure sensor 150, are not needed, further simplifying the construction of the fuel heating device 500.

Note, in this embodiment, although the heating element 141 and the washers 143 and 144 have a doughnut shape, these members may be disc shaped. Also, although the heating element 141 is made of a PTC ceramic material having a positive temperature coefficient characteristic in which a resistance is suddenly raised at a specific temperature, the heating element 141 may be made of other known ceramic materials.

Figure 8:
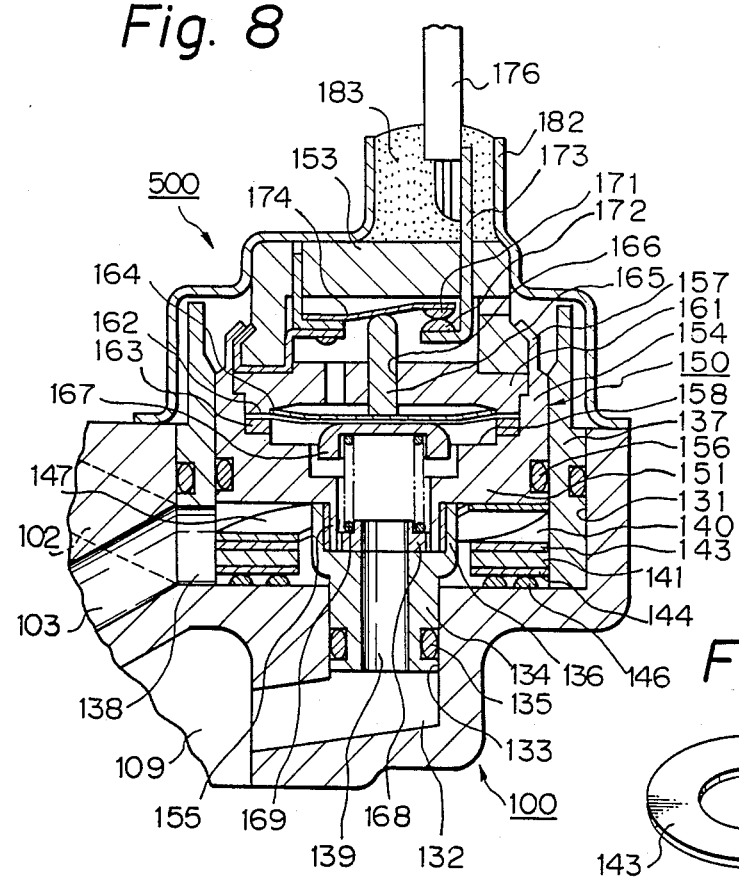
FIG. 8 is a sectional view of a fuel heating device of a second embodiment of the present invention.
Figure 9:
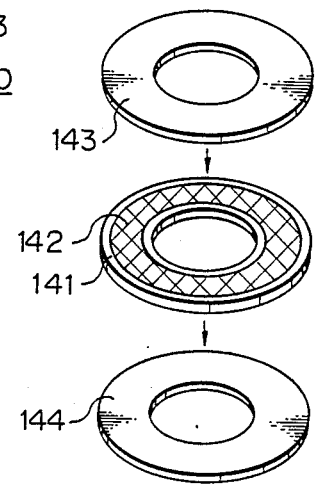
FIG. 9 is a perspective view of a heater of FIG. 8 in a disassembled state.

FIG. 8 shows a fuel heating device 500 of a second embodiment of the present invention. In this second embodiment, the washer 144 provided under the heating element 141 is in direct contact with semi-spherical projections 146 formed on the upper body 100. Also, as shown in FIG. 9, the second washer 145 provided in the first embodiment is omitted. An adhesive material 183 is filled in a portion at which the lead line 176 projects outside the cover 182, so that dirt and water cannot enter the cover 182, and the connecting plate 173 is fixed thereto. The remaining construction is basically the same as that of the first embodiment.

The second embodiment can be applied in a case where an electric difference between the washer 143 and the projection 146 is not large enough to generate an electrolytic corrosion. The construction of the second embodiment is simpler than the first embodiment, but the effects of the second embodiment is the same as that of the first embodiment, except for the effect derived from the second washer 145.

Figure 10:
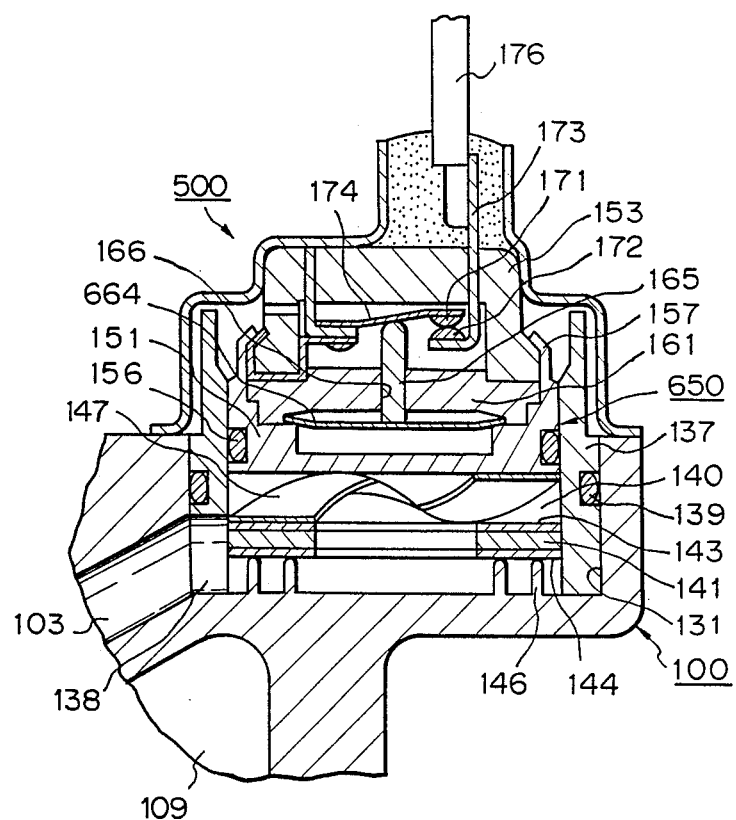
FIG. 10 is a sectional view of a fuel heating device of a third embodiment of the present invention.

FIG. 10 shows a fuel heating device 500 of a third embodiment of the present invention. The third embodiment is different from the first and second embodiments in that a temperature sensor 650 is provided instead of the pressure sensor of the first and second embodiments, and a dish-shaped bimetal plate 664 is provided instead of the dish-shaped metal plate 164 of the first and second embodiments. That is, the temperature sensor 650 senses a fuel temperature through the lower housing 151, and when the temperature is higher than a predetermined value, the bimetal plate 664 is deformed upward to open the contacts 171 and 172 through the rod 165. Conversely, when the temperature is lower than a predetermined value, the bimetal plate 664 is deformed downward to close the contacts 171 and 172 through the rod 165. Note, the bimetal plate 664 is formed by a layer of Nickel Chromium Iron Alloy and a layer of Nickel Iron Alloy. Thus, according to the third embodiment, it is unnecessary to sense a negative pressure in the outlet chamber 109 of the fuel filter assembly, so that the passage for leading the negative pressure to the pressure sensor, the diaphragm, and a mechanism for adjusting the operating pressure for the contacts, as in the first and second embodiments, can be omitted.

Figure 11:
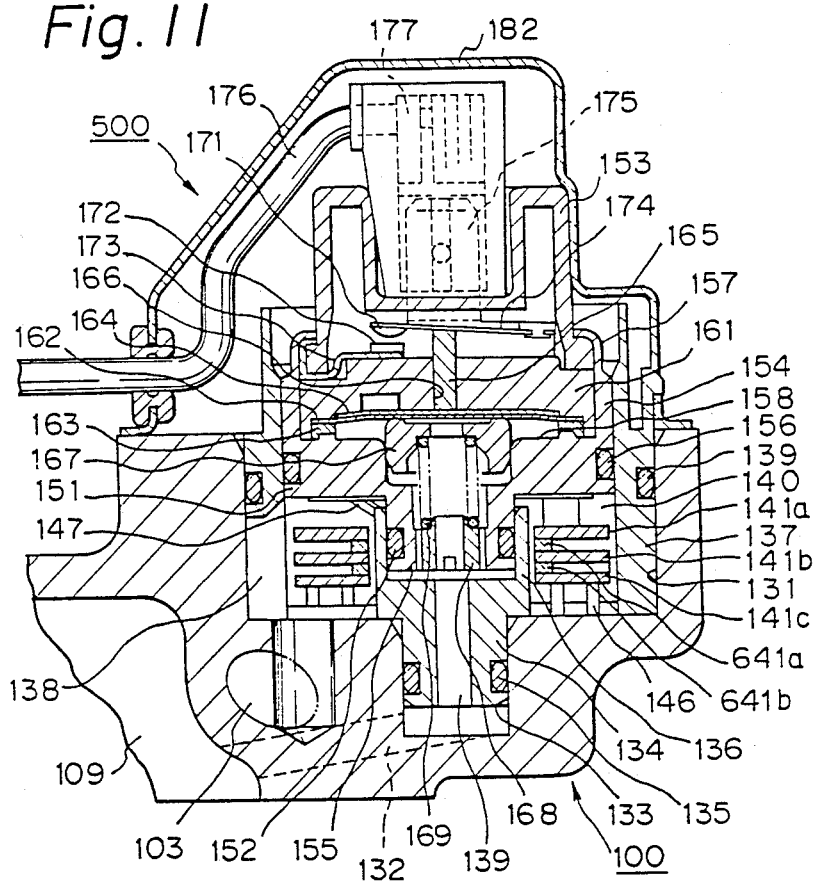
FIG. 11 is a sectional view of a fuel heating device of a fourth embodiment of the present invention.
Figure 12:
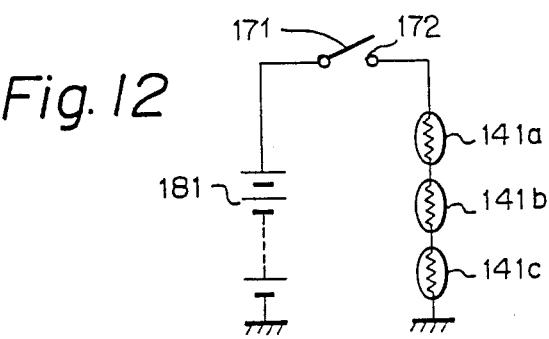
FIG. 12 is a diagram of an electric circuit of the fuel heating device shown in FIG. 11.
Figure 13:
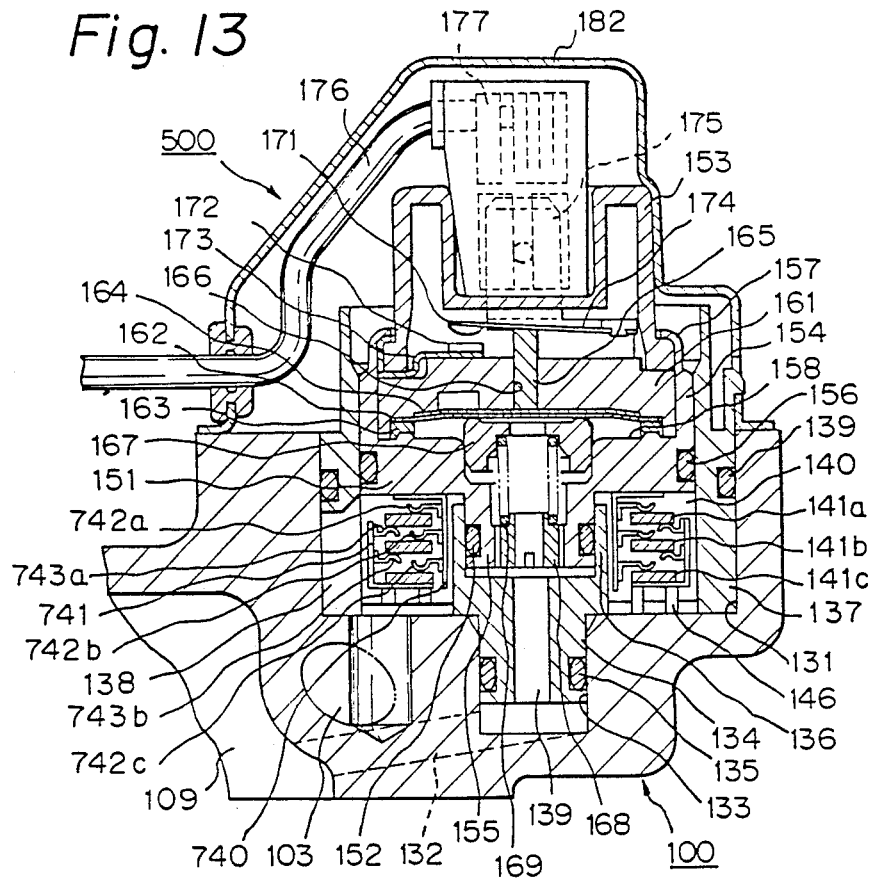
FIG. 13 is a sectional view of a fuel heating device of a fifth embodiment of the present invention.

FIGS. 11 and 12 show a fuel heating device 500 of a fourth embodiment of the present invention. In the fourth embodiment, as compared to the first embodiment shown in FIG. 4, the heating element has a different construction, although it is basically the same as in the first embodiment. Namely, three heating elements 141a, 141b, and 141c having the same shape are stacked one upon the other, and ring-shaped spacers 641a and 641b made of an electric conductive material are inserted between the heating elements 141a, 141b, and 141c, respectively. These spacers 641a and 641b have substantially the same thickness as and a radial width smaller than the heating elements 141a, 141b, and 141c.

Therefore, the upper and lower surfaces of the heating elements 141a, 141b, and 141c are in contact with the fuel over sufficiently broad areas. The heating elements 141a, 141b, and 141c are electrically connected to each other in-series as shown in FIG. 12. Although not shown in detail in FIG. 11, in the construction of the heating elements 141a, 141b, and 144c, the upper and lower surfaces thereof are formed as electrodes, and are covered with metal washers. Further, preferably the second washer is provided under the metal washer disposed under the lower surface of the heating element 141c provided at the lowest position, similar to the construction shown in FIG. 7, for preventing electrolytic corrosion.

A construction in which three heating elements are electrically connected in series can allow a reduction of the diameters of the heating elements 141a, 141b, and 141c, compared with the construction in which only one heating element is provided, when the electric source 181 outputs the same electric power as for the construction in which only one heating element is provided. Conversely, if the heating elements of the former and latter constructions have the same diameter, the former construction is provided with an improved heating ability. Further, according to this embodiment, since the area in contact with the fuel is enlarged, the fuel heating efficiency is improved.

Note that the number of heating elements is not restricted to 3, but can be increased or decreased according to need.

Figure 14:
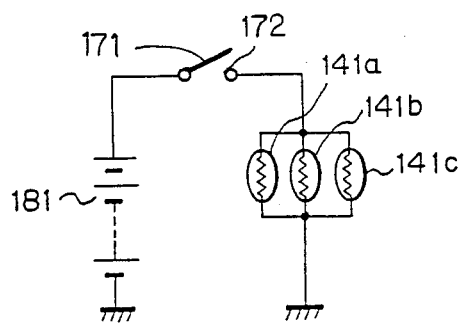
FIG. 14 is a diagram of an electric circuit of the fuel heating device shown in FIG. 13.

FIGS. 14 and 15 show a fuel heating device 500 of fifth embodiment of the present invention. The fifth embodiment is different from the fourth embodiment, in that the heating elements 141a, 141b, and 141c are electrically connected in parallel. The remaining construction is the same as that of the fourth embodiment. Namely, a first cylindrical member 740 having an L-shaped cross section is fixed to a surface of the lower housing 151 facing the annular chamber 140, and a second cylindrical member 741 having an L-shaped cross section and enclosing the first cylindrical member 740 is fixed to upper surfaces of the projections 146. Three heating elements 141a, 141b, and 141c are disposed between the first and second cylindrical members 740 and 741, and three positive electrode members 742a, 742b, and 742c are provided on the outer surface of the first cylindrical member 740, and serve also as springs. Two negative electrode members 743a and 743b are provided on the inner surface of the second-cylindrical member 741, and serve also as springs. The heating element 141a is supported between the electrode members 742a and 743a; the heating element 141b is supported between the electrode members 742b and 743b; and the heating element 141c is supported between the electrode member 742c and the bottom portion 741a of the second cylindrical member 741. Thus, the heating elements 141a, 141b, and 141c are electrically connected in parallel, as shown in FIG. 14. Each upper and lower surface of the heating elements 141a, 141b, and 141c is formed as an electrode and covered with metal washers.

In this embodiment, since the upper and lower surfaces of each heating element 141a, 141b, and 141c are in contact with fuel, the fuel heating efficiency is improved, and since the heating elements 141a, 141b, and 141c are electrically connected in parallel, the size of the heating element for obtaining a predetermined heat capacity is reduced, or the heat capacity of the heating elements is increased and the speed of temperature elevation of the heating element is increased, even though the same size heating elements are used.

The number of heating elements can be determined according to need.

Although embodiments of the present invention have been described hereinwith reference to the attached drawings, many modifications and changes may be made by those skilled in this art without departing from the scope of the invention.

We claim:

1. A fuel filter device having a heating device disposed in a fuel filter assembly provided in a fuel supply passage to an engine for heating the fuel flowing through a filter in said fuel filter assembly, said heating device comprising:

an electrically grounded fuel housing with a generally longitudinal axis and having therein a fuel chamber through which fuel flows to said filter element, and a switch chamber separate from said fuel chamber, electrical means for heating the fuel flowing through said fuel chamber and having two terminals, one of said terminals being electrically connected to said fuel housing, a snap action type switch in said switch chamber, and an electric power source having positive pole connected to said switch and a grounded negative pole, said switch comprising:

a fixed contact, a movable contact connected to said positive pole, a plate member deformable with a snap action, a rod extending between said movable contact and said plate member to transmit said snap action to said movable contact, a pressure-responsive diaphragm having one side thereof connected to said plate member, a displacement of said diaphragm being transmitted to said plate member, spring means urging said diaphragm and said plate member to displace and deform respectively in a direction to open said contacts, and a switch housing enclosing said contacts, said plate member, said rod and said diaphragm, said switch housing being electrically insulated from said fuel housing and being electrically connected to said fixed contact and to the other of said heating means terminals, whereby said switch housing acts as a positive pole with respect to said heating means, passage means in said assembly exposing the other side of said diaphragm to the pressure of the fuel downstream of said element, when said pressure being lower than a predetermined value said diaphragm being displaced against the urging of said spring in a direction to close said contacts to supply electric power to said heating means through said contacts, said switch housing, said heating means, and said fuel housing, in that order, so that said heating means heats the fuel flowing through said fuel chamber, said chambers, said diaphragm, said plate member, said rod, said spring means, said switch housing, and said heating means being generally aligned along axis of said housing.

2. A fuel filter device according to claim 1, wherein said heating means includes a heater element, said heater element being housed in said fuel housing to be in direct contact with a fuel flowing through said fuel chamber.

3. A fuel filter device according to claim 2, wherein said heater element is made of a material having a positive temperature coefficient of resistance, and has electric poles on opposite surfaces thereof for providing an electric current thereto.

4. A fuel filter device according to claim 3, wherein said heating means has a pair of metal plates in contact with said electric poles of said heater element.

5. A fuel filter device according to claim 2, wherein said fuel chamber has a plurality of projections on the bottom thereof, and said heating means is placed on said projections.

6. A fuel filter device having a heating device disposed in a fuel filter assembly provided in a fuel supply passage to an engine for heating the fuel flowing through a filter in said fuel filter assembly, said heating device comprising:

an electrically grounded fuel housing with a generally longitudinal axis having therein a fuel chamber through which fuel flows to said filter element, and a switch chamber separated from said fuel chamber by a wall, electrical means for heating the fuel flowing through said fuel chamber and having two terminals, one of said terminals being electrically connected to said fuel housing, a temperature-responsive switch in said switch chamber, and an electric power source having a positive pole connected to said switch and a grounded negative pole, said switching comprising:

a fixed contact, a movable contact connected to said positive pole, a bimetal member sensing the temperature of the fuel in said fuel chamber through said wall and deforming according to said temperature, a rod extending between said movable contact and said bimetal member to transmit the deformation thereof to said movable contact, and a switch housing enclosing said contacts, said plate member, said rod and said bimetal member, said switch housing being electrically insulated from said fuel housing and being electrically connected to said fixed contact and to the other of said heating means terminals, whereby said switch housing acts as a positive pole with respect to said heating means, said bimetal member being deformed in a direction to close said contacts when said fuel temperature is lower than a predetermined value and in a direction to open said contacts when said fuel temperature is higher than a predetermined value, whereby when said contacts are closed electric power is supplied to said heating means through said contacts, said switch housing, said heating means, and said fuel housing, in that order, so that said heating means heats the fuel flowing through said fuel chamber, said chambers, said bimetal member, said rod, said switch housing, and said heating means being generally aligned along the axis of said housing.

7. A fuel filter device for filtering fuel supplied to an internal combustion engine comprising:

a fuel filter assembly having a casing and a filter element housed therein, said casing having an inlet and an outlet, fuel flowing into said casing through said inlet and passing through said filter element to be filtered and flowing out from said casing through said outlet, a body connected to said casing in a fluid-tight manner, said body having an inlet port communicating with said inlet and an outlet port communicating with the upstream side of said filter element, and a heating device fixed to said body in a fluid-tight manner, said heating device comprising:

an electrically grounded fuel housing with a generally longitudinal axis and having therein a fuel chamber through which fuel flows to said filter element, and a switch chamber separate from said fuel chamber, electrical means for heating the fuel flowing through said fuel chamber and having two terminals, one of said terminals being electrically connected to said fuel housing, a snap action type switch in said switch chamber, and an electric power source having a positive pole connected to said switch and a grounded negative pole, said switch comprising:

a fixed contact, a movable contact connected to said positive pole, a plate member deformable with a snap action, a rod extending between said movable contact and said plate member to transmit said snap action to said movable contact, a pressure-responsive diaphragm having one side thereof connected to said plate member, a displacement of said diaphragm being transmitted to said plate member, spring means urging said diaphragm and said plate member to displace and deform respectively in a direction to open said contacts, and a switch housing enclosing said contacts, said plate member, said rod and said diaphragm, said switch housing being electrically insulated from said fuel housing and being electrically connected to said fixed contact and to the other of said heating means terminals, whereby said switch housing acts as a positive pole with respect to said heating means, passage means in said assembly exposing the other side of said diaphragm to the pressure of the fuel downstream of said filter element, when said pressure being lower than a predetermined value said diaphragm being displaced against the urging of said spring in a direction to close said contacts to supply electric power to said heating means through said contacts, said switch housing, said heating means, and said fuel housing, in that order, so that said heating means heats the fuel flowing through said fuel chamber, said chambers, said plate member, said rod, said spring means, said switch housing, and said heating means being generally aligned along said axis of said housing.

8. A fuel filter device according to claim 7, wherein said heating means includes a heater element made of a material having a positive temperature coefficient of resistance, and has electric poles on opposite surfaces thereof for providing an electric current thereto.

9. A fuel filter device according to claim 8, wherein said heating means has a pair of metal plates in contact with said electric poles of said heater element.

10. A fuel filter device according to claim 8, wherein said fuel chamber has a plurality of projections on the bottom thereof, and said heating means is placed on said projections.

11. A fuel filter device for filtering fuel supplied to an internal combustion engine, comprising:
- a fuel filter assembly having a casing and a filter element housed therein, said casing having an inlet and an outlet, fuel flowing into said casing through said inlet and passing through said filter element to be filtered and flowing out from said casing through said outlet,
- a body connected to said casing in a fluid-tight manner, said body having an inlet port communicating with said inlet and an outlet port communicating with the upstream side of said filter element, and
- a heating device fixed to said body in a fluid-tight manner, said heating device comprising:
- an electrically grounded fuel housing with a generally longitudinal axis and having therein a fuel chamber through which fuel flows to said filter element, and a switch chamber separated from said fuel chamber by a wall,
- electrical means for heating the fuel flowing through said fuel chamber and having two terminals, one of said terminals being electrically connected to said fuel housing,
- a temperature-responsive switch in said switch chamber, and
- an electric power source having a positive pole connected to said switch and a grounded negative pole, said switch comprising;
- a fixed contact,
- a movable contact connected to said positive pole,
- a bimetal member sensing the temperature of the fuel in said fuel chamber through said wall and deforming according to said temperature,
- a rod extending between said movable contact and said bimetal member to transmit the deformation thereof to said movable contact, and
- a switch housing enclosing said contacts, said plate member, said rod and said bimetal member, said which housing being electrically insulated from said fuel housing and being electrically connected to said fixed contact and to the other of said heating means terminals, whereby said switch housing acts as a positive pole with respect to said heating means, said bimetal member being deformed in a direction to close said contacts when said fuel temperature is lower than a predetermined value and in a direction to open said contacts when said fuel temperature is higher than a predetermined value, whereby when said contacts are closed electric power is supplied to said heating means through said contacts, said switch housing, said heating means, and said fuel housing, in that order, so that said heating means heats the fuel flowing through said fuel chamber, said chambers, said bimetal member, said rod, said switch housing, and said heating means being generally aligned along the axis of said housing.

* * * * *